US009152253B2

(12) United States Patent
Liu et al.

(10) Patent No.: US 9,152,253 B2
(45) Date of Patent: Oct. 6, 2015

(54) REMOTE CONTROL METHOD, REMOTE CONTROL APPARATUS, AND DISPLAY APPARATUS

(71) Applicant: Sony Corporation, Minato-ku (JP)

(72) Inventors: Yinghuan Liu, Pudong New Area Shanghai (CN); Chun Xu, Pudong New Area Shanghai (CN); Chunmin Li, Pudong New Area Shanghai (CN)

(73) Assignee: SONY CORPORATION, Tokyo (JP)

( * ) Notice: Subject to any disclaimer, the term of this patent is extended or adjusted under 35 U.S.C. 154(b) by 119 days.

(21) Appl. No.: 13/923,619

(22) Filed: Jun. 21, 2013

(65) Prior Publication Data

US 2014/0009386 A1 Jan. 9, 2014

(30) Foreign Application Priority Data

Jul. 3, 2012 (CN) .......................... 2012 1 0229379

(51) Int. Cl.
*G06F 3/038* (2013.01)
*G06F 3/033* (2013.01)
*G06F 3/0481* (2013.01)
*H04N 5/445* (2011.01)
*H04N 21/485* (2011.01)

(52) U.S. Cl.
CPC ................ *G06F 3/038* (2013.01); *G06F 3/033* (2013.01); *G06F 3/0481* (2013.01); *H04N 5/44582* (2013.01); *H04N 5/44591* (2013.01); *H04N 21/4858* (2013.01); *G06F 2203/04803* (2013.01); *G09G 2320/08* (2013.01)

(58) Field of Classification Search
CPC .......... G09G 2320/08; G09G 2320/00; G09G 2320/0209; G09G 2310/06; G09G 2310/02; G09G 2310/061; G09G 2354/00; G09G 5/003; G01S 13/89
USPC ............................ 345/156, 97, 211, 619, 660
See application file for complete search history.

(56) References Cited

U.S. PATENT DOCUMENTS 6,052,106 A * 4/2000 Maltese .......................... 345/97
8,836,730 B1 * 9/2014 Desai et al. .................. 345/660
8,902,248 B1 * 12/2014 Bidarkar et al. ............. 345/619
2007/0002035 A1 * 1/2007 Plut .............................. 345/211
2013/0162501 A1 * 6/2013 Tsuda et al. .................. 345/1.1
2013/0250251 A1 * 9/2013 Kubota .......................... 353/57
2013/0329138 A1 * 12/2013 Minemura et al. ............ 348/720
2013/0342761 A1 * 12/2013 Wada ............................ 348/571

* cited by examiner

*Primary Examiner* — Fred Tzeng

(74) *Attorney, Agent, or Firm* — Oblon, McClelland, Maier & Neustadt, L.L.P.

(57) ABSTRACT

The present invention discloses a remote control method, apparatus, and display apparatus. Said remote control method is applied in a remote control apparatus for remotely controlling display of one or more signal sources in a display screen of a display apparatus. Said method comprises: determining a layout control image, one or more windows being comprised in said layout control image; generating layout control information according to the layout of said one or more windows in said layout control image; and sending said layout control information to said display apparatus, so that said display apparatus sets correspondingly the layout of said one or more signal sources in the display screen of said display apparatus according to the layout of said one or more windows in said layout control image. Therefore, a user can implement flexible control operations of display configuration in a visual manner, and the user experience can be improved.

16 Claims, 11 Drawing Sheets obtaining layout control image — S310
determining alayout control image — S320
generating layout control information — S330
sending the layout control information to the display apparatus — S340
receiving the layout control information — S350
setting the layout of one or more signal sources in the display screen of the display apparatus — S360

REMOTE CONTROL METHOD, REMOTE CONTROL APPARATUS, AND DISPLAY APPARATUS

BACKGROUND

The present invention relates to the field of computer technologies, and more particularly, to a remote control method, a remote control apparatus, and a display apparatus.

With the continuous development of display technologies, sizes of display apparatus such as television sets, computer monitors and the like become larger and larger, and functions of them become richer and richer. The display apparatus able to display simultaneously multiple signal sources (i.e., display contents) in a display screen using means such as widgets and so on even appear.

Because of the unceasing promotion of functions of display apparatus, remote control operations for these display apparatus become more and more complex. However, nowadays, traditional remote controllers are still mainly adopted to perform remote control over these display apparatus.

It is hard to flexibly perform various control operations of display configuration on a display apparatus, such as enabling one or more signal sources to be displayed simultaneously in a display screen of the display apparatus, self-defining the layout of the signal sources in the display screen, quickly switching among the signal sources, and the like, by using the conventional remote controllers.

Therefore, a new type of remote control apparatus and method is required to enable a user to achieve flexible control over the display apparatus.

SUMMARY

In order to solve the above technical problems, according to one aspect of the present invention, there is provided a remote control method applied in a remote control apparatus, said remote control apparatus being used to remotely control display of one or more signal sources in a display screen of a display apparatus, said method comprising: determining a layout control image, one or more windows being comprised in said layout control image; generating layout control information according to the layout of said one or more windows in said layout control image; and sending said layout control information to said display apparatus, so that said display apparatus sets correspondingly the layout of said one or more signal sources in the display screen of said display apparatus according to the layout of said one or more windows in said layout control image.

Further, according to another aspect of the present invention, there is provided a remote control method applied in a display apparatus, said display apparatus being used to display one or more signal sources in a display screen according to remote controlling of a remote control apparatus, said method comprising: receiving layout control information indicating the layout of one or more windows comprised in layout control image, said layout control image being determined in said remote control apparatus; and setting correspondingly the layout of said one or more signal sources in the display screen of said display apparatus according to the layout of said one or more windows in said layout control image.

According to still another aspect of the present invention, there is provided a remote control apparatus for remotely controlling display of one or more signal sources in a display screen of a display apparatus, said apparatus comprising: a determining unit for determining a layout control image, one or more windows being comprised in said layout control image; a generating unit for generating layout control information according to the layout of said one or more windows in said layout control image; and a sending unit for sending said layout control information to said display apparatus, so that said display apparatus sets correspondingly the layout of said one or more signal sources in the display screen of said display apparatus according to the layout of said one or more windows in said layout control image.

According to still another aspect of the present invention, there is provided a display apparatus for displaying one or more signal sources in a display screen according to remote controlling of a remote control apparatus, said apparatus comprising: a receiving unit for receiving layout control information indicating the layout of one or more windows comprised in layout control image, said layout control image being determined in said remote control apparatus; and a setting unit for setting correspondingly the layout of said one or more signal sources in the display screen of said display apparatus according to the layout of said one or more windows in said layout control image.

Compared with the prior art, adopting the remote control method, the remote control apparatus, and the display apparatus according to the present invention, it is possible to generate layout control information in the remote control apparatus according to the layout of one or more windows comprised in the layout control image and send it to the display apparatus; and then in display apparatus, it is possible to set correspondingly the layout of one or more signal sources displayed in the display screen of the display apparatus according to the layout of the one or more windows in accordance with said layout control information. Therefore, in the present invention, the layout of signal sources on the display apparatus may be defined by determining the layout control image, and the layout of the signal sources on the display apparatus may be switched dynamically by switching the layout control image on the remote control apparatus, so that a user can implement flexible control operations of display configuration on the display apparatus in a visual manner, and the user experience can be improved.

Other features and advantages of the present invention will be set forth in the subsequent description, and will partially become apparent therefrom, or can be understood by carrying out the present invention. The objectives and other advantages of the present invention can be realized and attained by the structures pointed out particularly in the specification, the claims, and the drawings.

BRIEF DESCRIPTION OF THE DRAWINGS

The drawings are used to provide a further understanding of the present invention, and constitute a portion of the specification. They are for explaining the present invention together with embodiments of the present invention, and do not constitute any limitation on the present invention. In the drawings.

DETAILED DESCRIPTION

Figure 1:
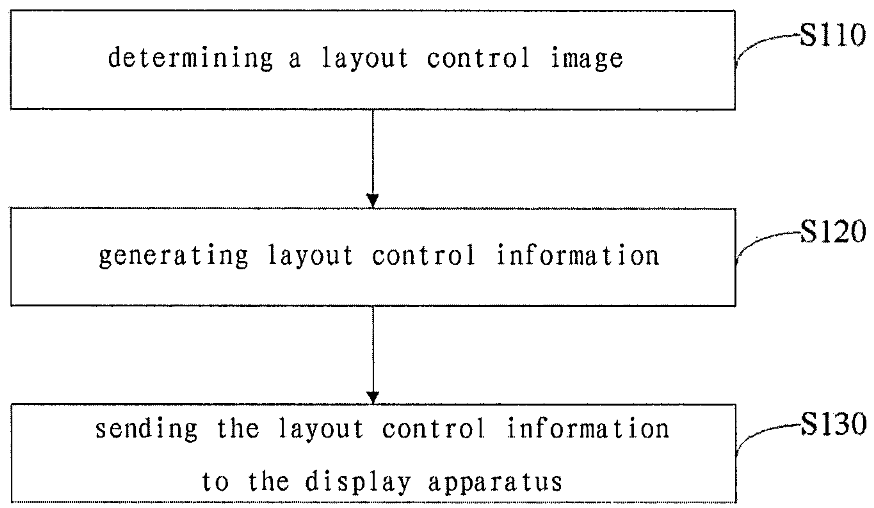
FIG. 1 illustrates a remote control method according to the present invention.

Various embodiments according to the present invention will be described in detail with reference to the drawings. Here it should be noted that, in the drawings, components having substantially the same or similar structures and functions are endowed with the same reference signs, and repeated descriptions for them will be omitted.

With the continuous development of computer technologies, portable electronic apparatus such as notebook computers, tablet computers (PAD), mobile phones, multimedia players, personal digital assistant (PDA) and the like become more and more popular. These portable electronic apparatus not only can accomplish communication functions such as calling, sending messages, etc., but also can play different roles of game centers, media centers, office assistants, and so on.

For all these reasons, inventors of the present invention conceive that: portable electronic apparatus that have excellent human-computer interaction interfaces and diverse data connection manners can be taken to replace the traditional remote controllers to perform remote control over the display apparatus.

Hereinafter, a remote control method, a remote control apparatus, and a display apparatus according to the present invention will be described with reference to FIGS. 1-4.

Figure 2:
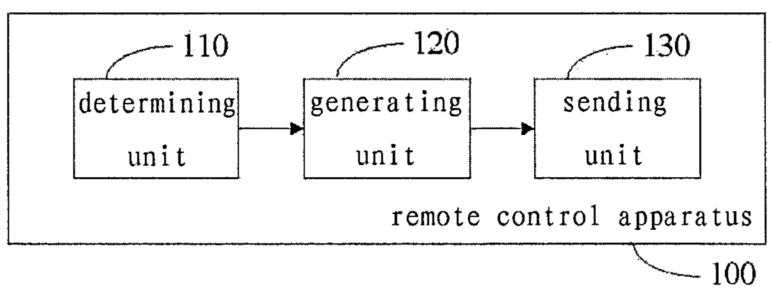
FIG. 2 illustrates a remote control apparatus according to the present invention.

FIG. 1 illustrates a remote control method according to the present invention, and FIG. 2 illustrates a remote control apparatus according to the present invention.

The remote control method shown in FIG. 1 is applied to the remote control apparatus 100 shown in FIG. 2. The remote control apparatus 100 is used to remotely control display of one or more signal sources in a display screen of a display apparatus. Specifically, the remote control apparatus 100 comprises: a determining unit 110, a generating unit 120, and a sending unit 130.

As shown in FIG. 1, the remote control method comprises:

in step S110, the determining unit 110 determines a layout control image, one or more windows being comprised in said layout control image;

in step S120, the generating unit 120 generates layout control information according to the layout of said one or more windows in said layout control image determined by the determining unit 110; and in step S130, the sending unit 130 sends to said display apparatus the layout control information generated by the generating unit 120, so that said display apparatus sets correspondingly the layout of said one or more signal sources in the display screen of said display apparatus according to the layout of said one or more windows in said layout control image.

Figure 3:
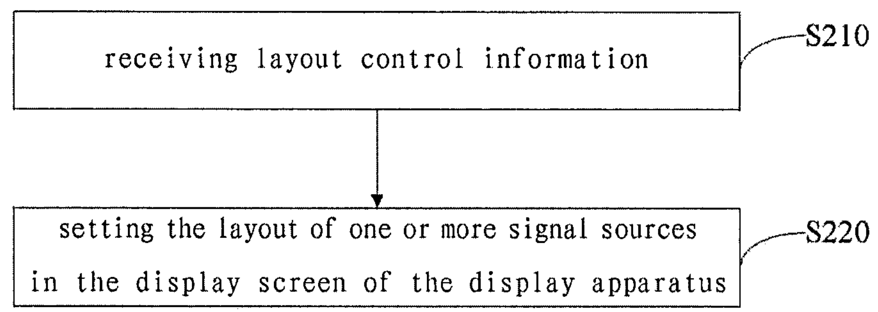
FIG. 3 illustrates a remote control method according to the present invention.
Figure 4:
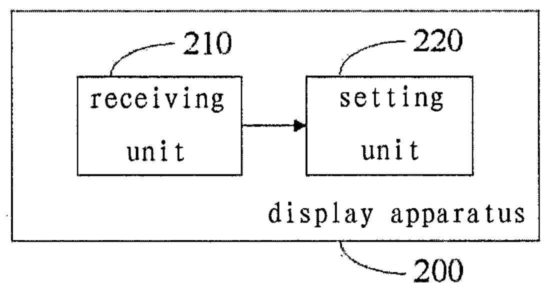
FIG. 4 illustrates a display apparatus according to the present invention.

FIG. 3 illustrates a remote control method according to the present invention, and FIG. 4 illustrates a display apparatus according to the present invention.

The remote control method shown in FIG. 3 is applied to the display apparatus 200 shown in FIG. 4. The display apparatus 200 is used to display one or more signal sources in a display screen according to remote controlling of a remote control apparatus. Specifically, the display apparatus 200 comprises: a receiving unit 210 and a setting unit 220.

As shown in FIG. 3, the remote control method comprises:

in step S210, the receiving unit 210 receives layout control information indicating the layout of one or more windows comprised in layout control image, said layout control image being determined in said remote control apparatus; and In step S220, the setting unit 220 sets correspondingly the layout of said one or more signal sources in the display screen of said display apparatus according to the layout of said one or more windows in said layout control image.

Thus it can be seen that, adopting the remote control method, the remote control apparatus, and the display apparatus according to the present invention, it is possible to generate layout control information in the remote control apparatus according to the layout of one or more windows comprised in the layout control image and send it to the display apparatus; and then in display apparatus, it is possible to set correspondingly the layout of one or more signal sources displayed in the display screen of the display apparatus according to the layout of the one or more windows in accordance with said layout control information. Therefore, in the present invention, the layout of signal sources on the display apparatus may be defined by determining the layout control image, and the layout of the signal sources on the display apparatus may be switched dynamically by switching the layout control image on the remote control apparatus, so that a user can implement flexible control operations of display configuration on the display apparatus in a visual manner, and the user experience can be improved.

Hereinafter, a remote control method, a remote control apparatus, and a display apparatus according to a first embodiment of the present invention will be described with reference to FIGS. 5 and 6.

Figure 5:
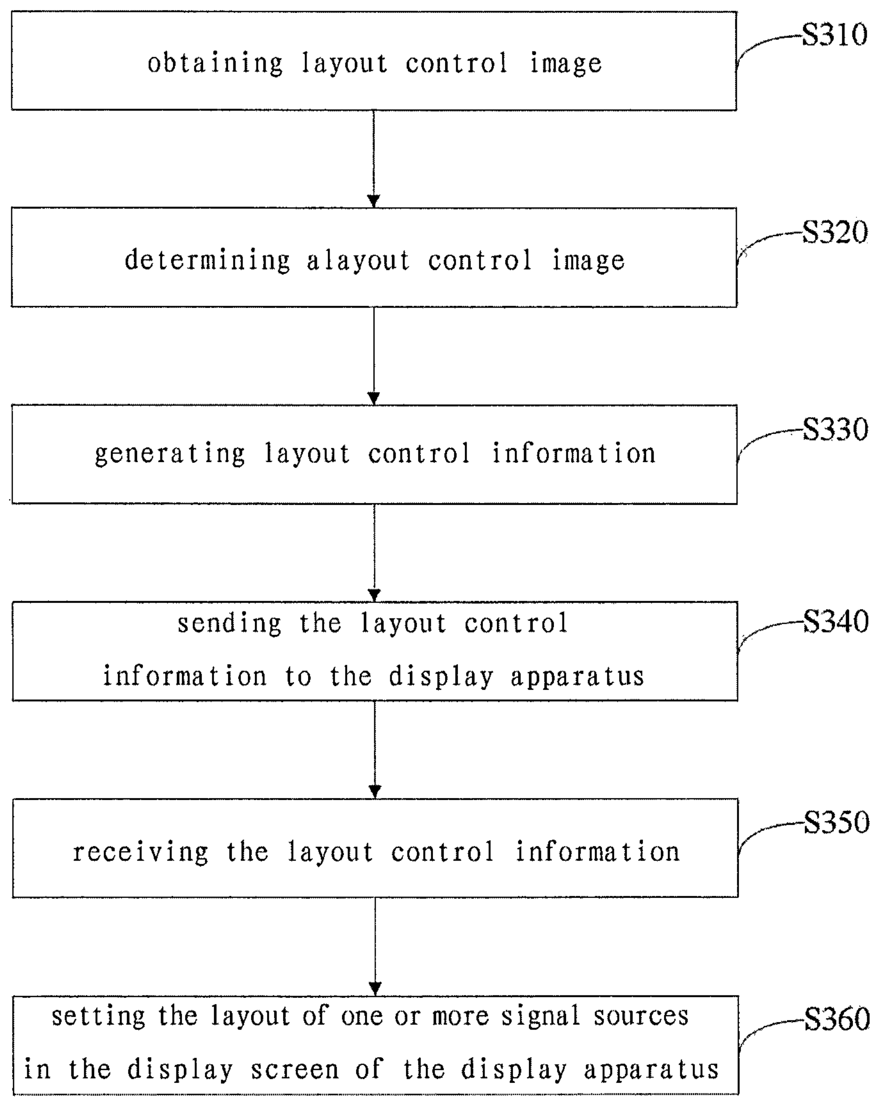
FIG. 5 illustrates a remote control method according to a first embodiment of the present invention.
Figure 6:
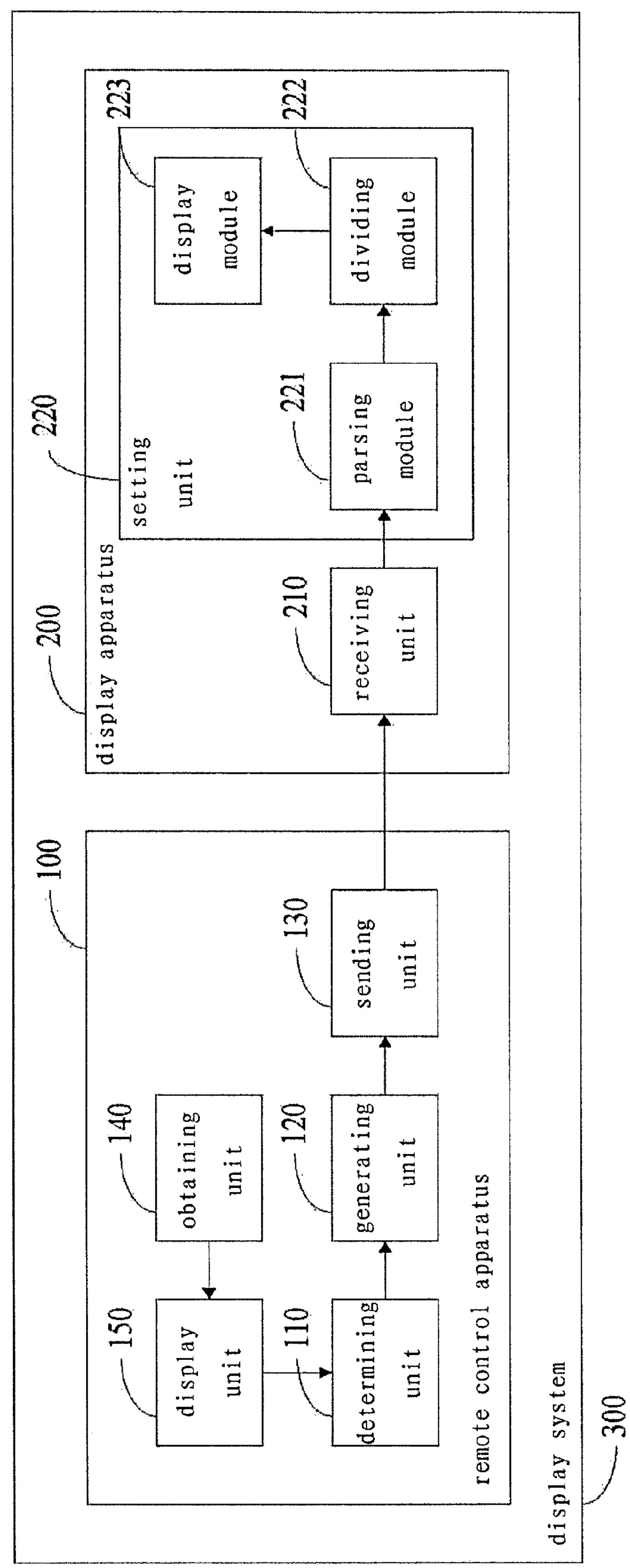
FIG. 6 illustrates a display system according to the first embodiment of the present invention.

FIG. 5 illustrates a remote control method according to a first embodiment of the present invention, and FIG. 6 illustrates a display system according to the first embodiment of the present invention.

The remote control method according to the first embodiment of the present invention shown in FIG. 5 may be applied to the display system 300 shown in FIG. 6. As shown in FIG. 6, the display system 300 comprises: a remote control apparatus 100 and a display apparatus 200. The remote control apparatus 100 and the display apparatus 200 are connected together in various ways (such as via a wired network, and via a wireless network), and transmit communication data in accordance with agreed data formats. Through the interactive communication between the remote control apparatus 100 and the display apparatus 200, various operations of the display apparatus 200 can be controlled. Herein, cellphones and tablet computers, etc. may be mentioned as examples of the remote control apparatus 100, while televisions and computer monitors, etc. may be mentioned as examples of the display apparatus 200; but the remote control apparatus 100 and the display apparatus 200 are not limited to the aforementioned examples.

The remote control apparatus 100 comprises: a determining unit 110, a generating unit 120, a sending unit 130, an obtaining unit 140, and a display unit 150.

The display apparatus 200 comprises: a receiving unit 210 and a setting unit 220. Wherein, the setting unit 220 comprises: a parsing module 221, a dividing module 222, and a display module 223.

As shown in FIG. 5, the remote control method according to the first embodiment of the present invention comprises:

In step S310, layout control images are obtained.

Specifically, when a user desires to use the display apparatus 200 such as a television and the like, the user may operate the remote control apparatus 100 such as a tablet computer and the like to perform remote control operations to the display apparatus 200. At this time, the user may first turn on the power of the remote control apparatus 100, and invoke related control applications in remote control apparatus 100.

At this time, the obtaining unit 140 in the remote control apparatus 100 obtains multiple preset layout control images. The multiple layout control images may be stored in advance in a memory (not shown) of the remote control apparatus 100, may also be stored in advance in a memory (not shown) of the display apparatus 200, and may also be obtained by the obtaining unit 140 from any storage apparatus (not shown) connected with the remote control apparatus 100 via a network.

Figure 9A:
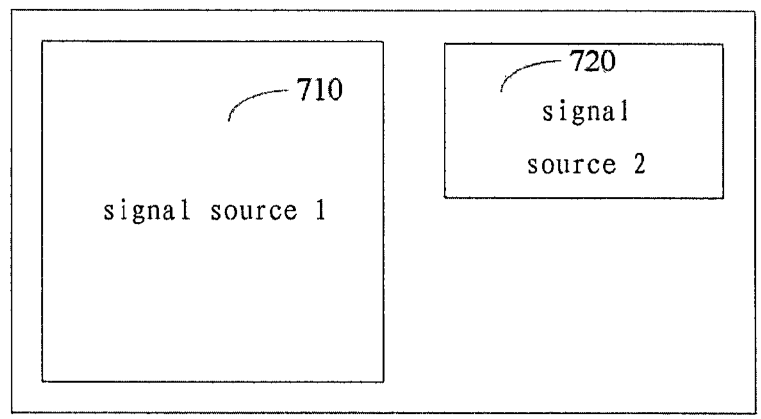
FIGS. 9*a*-9*c* illustrate examples of layout control images according to embodiments of the present invention.
Figure 9B:
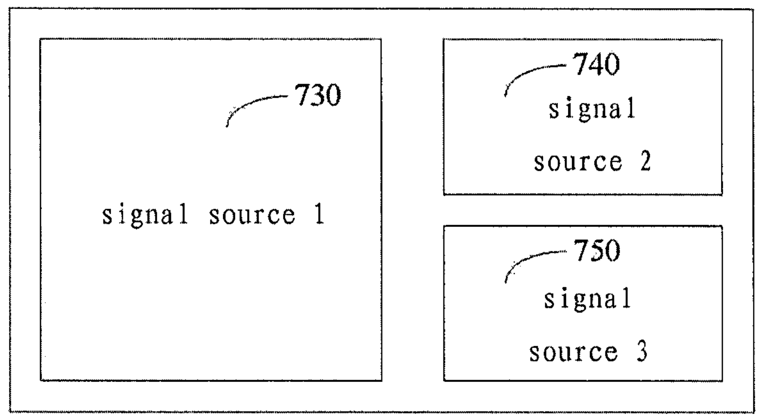
Figure 9C:
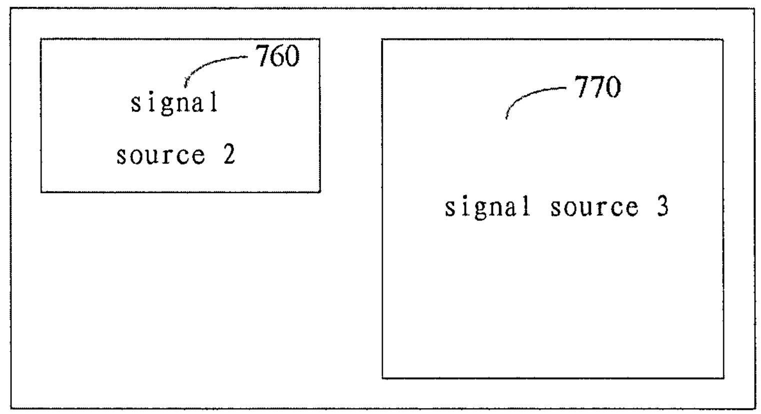

FIGS. 9*a*-9*c* illustrate examples of layout control images according to embodiments of the present invention.

Layout control images are set in advance by the user, the length-width ratio of borders of the image being equal to or approximately equal to the length-width ratio of a display screen of the display apparatus 200, and are for visually indicating the layout of one or more signal sources that the user desires to display in the display screen of the display apparatus 200.

For example, as shown in FIG. 9*a*, a first layout control image comprises two windows 710 and 720, the window 710 occupies the entire left half portion of the entire image, and the window 720 occupies the upper half part in the right half portion of the entire image, wherein the window 710 is identified as signal source 1, and the window 720 is identified as signal source 2. This indicates that the user desires to display two signal sources, i.e., signal source 1 and signal source 2, in the display screen of the display apparatus 200. Wherein, signal source 1 occupies the entire left half portion of the entire display screen, and signal source 2 occupies the upper part in the right half portion of the entire display screen.

As shown in FIG. 9*b*, a second layout control image comprises three windows 730, 740, and 750, identified respectively as signal source 1, signal source 2, and signal source 3. This indicates that the user desires to display three signal sources, i.e. signal source 1, signal source 2, and signal source 3, in the display screen. Wherein, signal source 1 occupies the entire left half portion of the display screen, signal source 2 occupies the upper half part in the right half portion of the display screen, and signal source 3 occupies the lower half part in the right half portion of the display screen.

Likewise, as shown in FIG. 9*c*, a third layout control image comprises two windows 760 and 770, identified respectively as signal source 2 and signal source 3. This indicates that the user desires to display two signal sources, i.e., signal source 2 and signal source 3, in the display screen. Wherein, signal source 2 occupies the upper half part in the left portion of the display screen, and signal source 3 occupies the entire right half portion of the display screen.

In step S320, a layout control image is determined.

Specifically, after obtaining the multiple preset layout control images, the obtaining unit 140 sends them to the display unit 150. The display unit 150 displays the multiple preset layout control images to the user.

In one example, the display unit 150 may display one layout control image to the user at one time. Preferably, the display unit 150 may be a touch screen, and the user can switch the layout control image being displayed currently through a sliding operation on the touch screen. Of course, the user may also switch the layout control image being displayed currently through other input units (e.g., a keyboard, a mouse, etc.).

In another example, the display unit 150 may display multiple layout control images to the user at one time. At this time, the display unit 150 may switch the currently-displayed multiple layout control images through a sliding operation on the touch screen.

Thereafter, the determining unit 110 selects one layout control image from the displayed multiple layout control images according to the user's input operation (e.g., a touch-to-click behavior), so as to determine the layout control information that the user desires to use.

In step S330, layout control information is generated.

Specifically, the generating unit 120 generates the layout control information according to the layout control image determined by the user, and the layout control information may comprise: the number of signal sources displayed in the display screen of the display apparatus 200, as well as the identifier, the display location, the display size, the display shape, and/or additional information, etc. of each signal source.

For example, when the determining unit 110 selects the first layout control image shown in FIG. 9*a* as a final layout control image according to the user's operation in step S320, the generating unit 120 generates layout control information, the layout control information indicating that: the user desires to display two signal sources in the display screen of the display apparatus 200; their identifiers are signal source 1 and signal source 2, respectively; signal source 1 is a rectangle that occupies the entire half left portion of the display screen, and signal source 2 is a rectangle that occupies the lower half part in the right half portion of the display screen.

In step S340, the layout control information is sent to the display apparatus 200.

Specifically, after generating the layout control information, the generating unit 120 sends said information to the sending unit 130.

At this time, the remote control apparatus 100 may establish a connection with the display apparatus 200 in various ways, and power on the display apparatus 200 by, for example, triggering an activation signal, and the sending unit 130 sends said layout control information through the established connection to the display apparatus 200, so that the display apparatus 200 sets correspondingly the layout of said one or more signal sources in the display screen of the display apparatus 200 according to the layout of said one or more windows in said layout control image.

In step S350, the layout control information is received.

Specifically, after the display apparatus 200 establishes the connection with the remote control apparatus 100, the receiving unit 210 of the display apparatus 200 receives the layout control information from the sending unit 130 of the remote control apparatus 100.

In step S360, the layout of one or more signal sources in the display screen of the display apparatus is set.

Specifically, after receiving the layout control information, the receiving unit 210 sends it to the setting unit 220.

At this time, in the setting unit 220, the parsing module 221 is used to parse the layout control information, extract the number of signal sources to be displayed in the display screen of the display apparatus 200, as well as the identifier, the display location, the display size, the display shape, and/or the additional information, etc. of each signal source that the user desires to use.

The dividing module 222 divides correspondingly the display screen of the display apparatus 200 into one or more areas according to the number of signal sources, and the display location, the display size and the display shape of each signal source, causes the layout of said one or more areas in said display screen to correspond proportionally to the layout of said one or more windows in said layout control image. Thereafter, the dividing module 222 notifies the display module 223 of the identifiers of the signal sources corresponding to said one or more areas.

The display module 223 obtains display signals of the signal sources according to the identifiers of the signal sources, and displays the display signals of each signal source in the area corresponding thereto.

Thus it can be seen that, adopting the remote control method and the display system according to the first embodiment of the present invention, it is possible to obtain multiple preset display layouts, generate layout control information according to the display layout selected by the user in the remote control apparatus, and finally cause the display apparatus to display one or more signal sources in the display screen according to said layout control information. Therefore, in the present invention, the display apparatus can display simultaneously multiple different signal sources according to the user's requirement, and define and dynamically switch the layout of the signal sources in the display screen, so that the user can conveniently accomplish the plan and definition to the layout of the display apparatus by using the remote control apparatus.

Here, it should be noted that, although, in the above step S320, it is described that the user needs to select among the layout control images so as to determine the layout control image, and further generate the layout control information, the present invention is not limited thereto.

In another example, the user selecting operation in step S320 may be omitted. That is, while the user is browsing the respective layout control images, the determining unit can cause the generating unit to generate in real-time layout control information according to the layout control image being browsed currently, so that one or more signal sources corresponding thereto are displayed synchronously in the display screen of the display apparatus. Thus, when the user is browsing from the first layout control image to the second layout control image, the generating unit may also correspondingly generate in real-time the layout control information corresponding to the second layout control image, thereby the display apparatus can change in real-time the layout of the currently-displayed signal source according to the changed layout control information, such that the user can fast experience actual display effect corresponding to each layout control image while operating on the remote control apparatus, which further improves the user experience.

Hereinafter, a remote control method, a remote control apparatus, and a display apparatus according to a second embodiment of the present invention will be described with reference to FIGS. 7 and 8.

Figure 7:
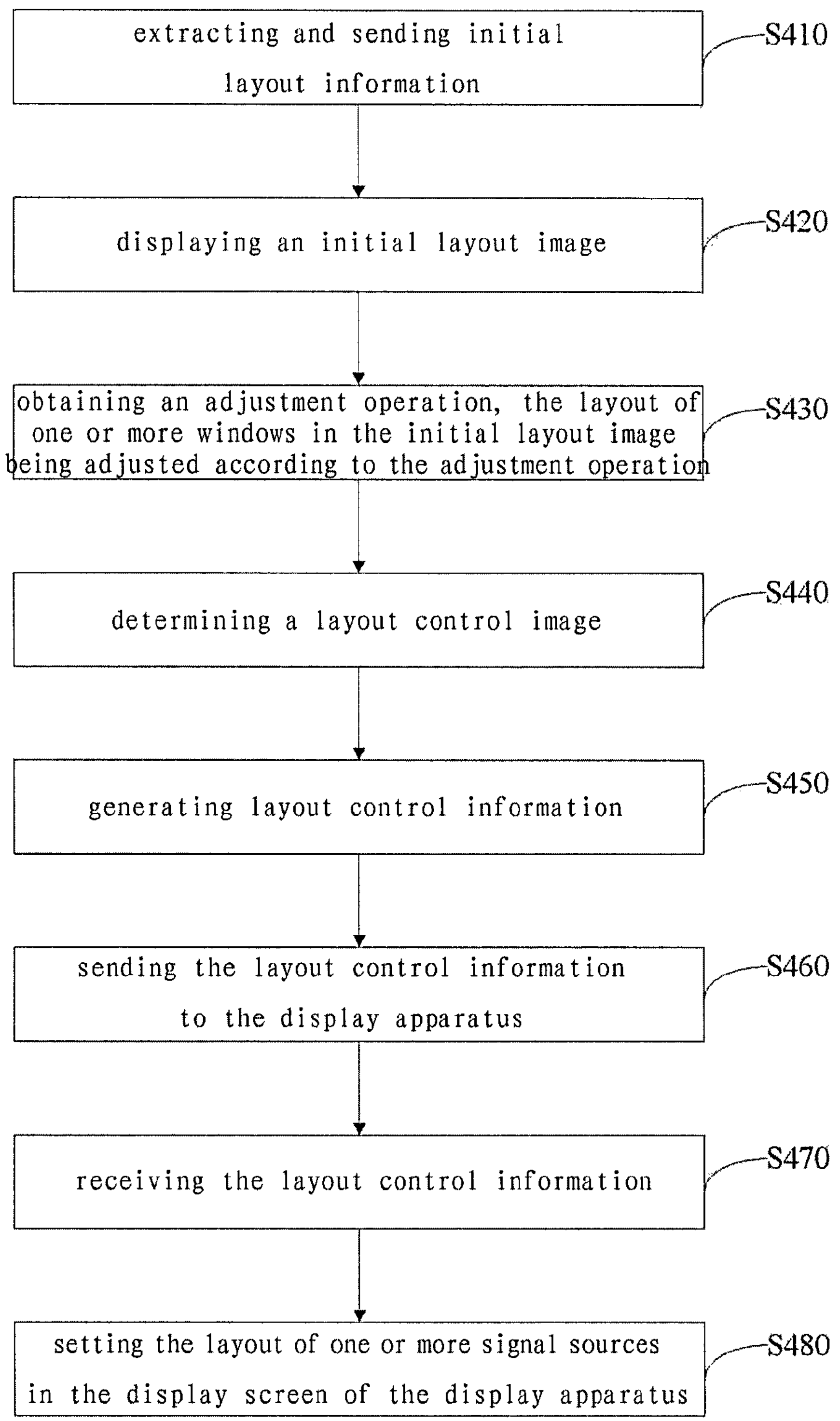
FIG. 7 illustrates a remote control method according to a second embodiment of the present invention.
Figure 8:
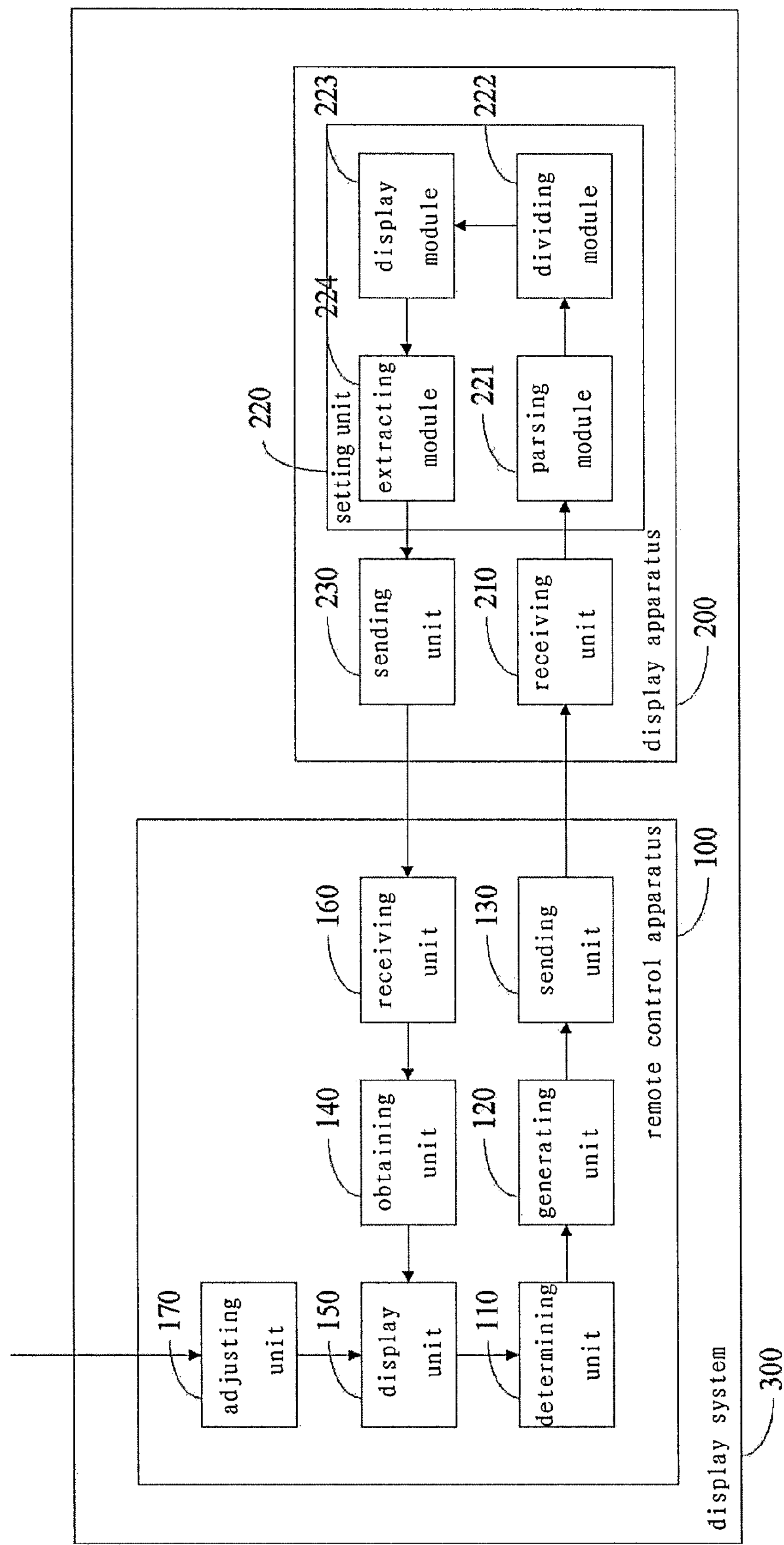
FIG. 8 illustrates a display system according to the second embodiment of the present invention.

FIG. 7 illustrates a remote control method according to a second embodiment of the present invention, and FIG. 8 illustrates a display system according to the second embodiment of the present invention.

The remote control method according to the second embodiment of the present invention shown in FIG. 7 may be applied to the display system 300 shown in FIG. 8. As shown in FIG. 8, the display system 300 comprises: a remote control apparatus 100 and a display apparatus 200. Through the interactive communication between the remote control apparatus 100 and the display apparatus 200, various operations of the display apparatus 200 can be controlled.

The remote control apparatus 100 comprises: a determining unit 110, a generating unit 120, a sending unit 130, an obtaining unit 140, a display unit 150, a receiving unit 160, and an adjusting unit 170.

The display apparatus 200 comprises: a receiving unit 210, a setting unit 220, and a sending unit 230. Wherein, the setting unit 220 comprises: a parsing module 221, a dividing module 222, a display module 223, and an extracting module 224.

As shown in FIG. 7, the remote control method according to the second embodiment of the present invention comprises:

In step S410, initial layout information is extracted and sent.

Specifically, before a user carries out control over various operations of the display apparatus 200 by using the remote control apparatus 100, a connection between the two is established first. At this time, the user may simultaneously turn on the power of the remote control apparatus 100 and the power of the display apparatus 200. And, for example, a WebSocket connection may be established between the remote control apparatus 100 and the display apparatus 200. After establishing the WebSocket connection, the user may invoke and operate related control applications in the remote control apparatus 100 through control means such as touch manipulation, voice recognition, or a gravity sensor and so on.

Here, as a first example, the remote control apparatus 100 and the display apparatus 200 may be connected through a wireless local area network. At this time, the user operates in remote control apparatus 100 an browser installed therein, thereby inputs a connection establishing instruction in the address bar (e.g., a uniform resource locator URL provided to access the display apparatus 200), so as to connect to the display apparatus 200. But those skilled in the art should know that said connection is not limited to being carried out via the browser, and it may also be implemented through other interfaces or operating manners.

As a second example, for example, a quick response (QR) code is displayed in the display screen of the display apparatus 200 or printed on its housing, and in the remote control apparatus 100, the QR code is photographed by a camera and so on equipped thereon, and a QR code identification application installed in advance is run, so as to identify the connection identifier of the display apparatus 200 (for example, a URL, an Internet Protocol (IP) address and so on), thus establishing the connection therebetween. Below, taking the second example as the scenario, embodiments of the present invention will be described continuously.

Figure 10:
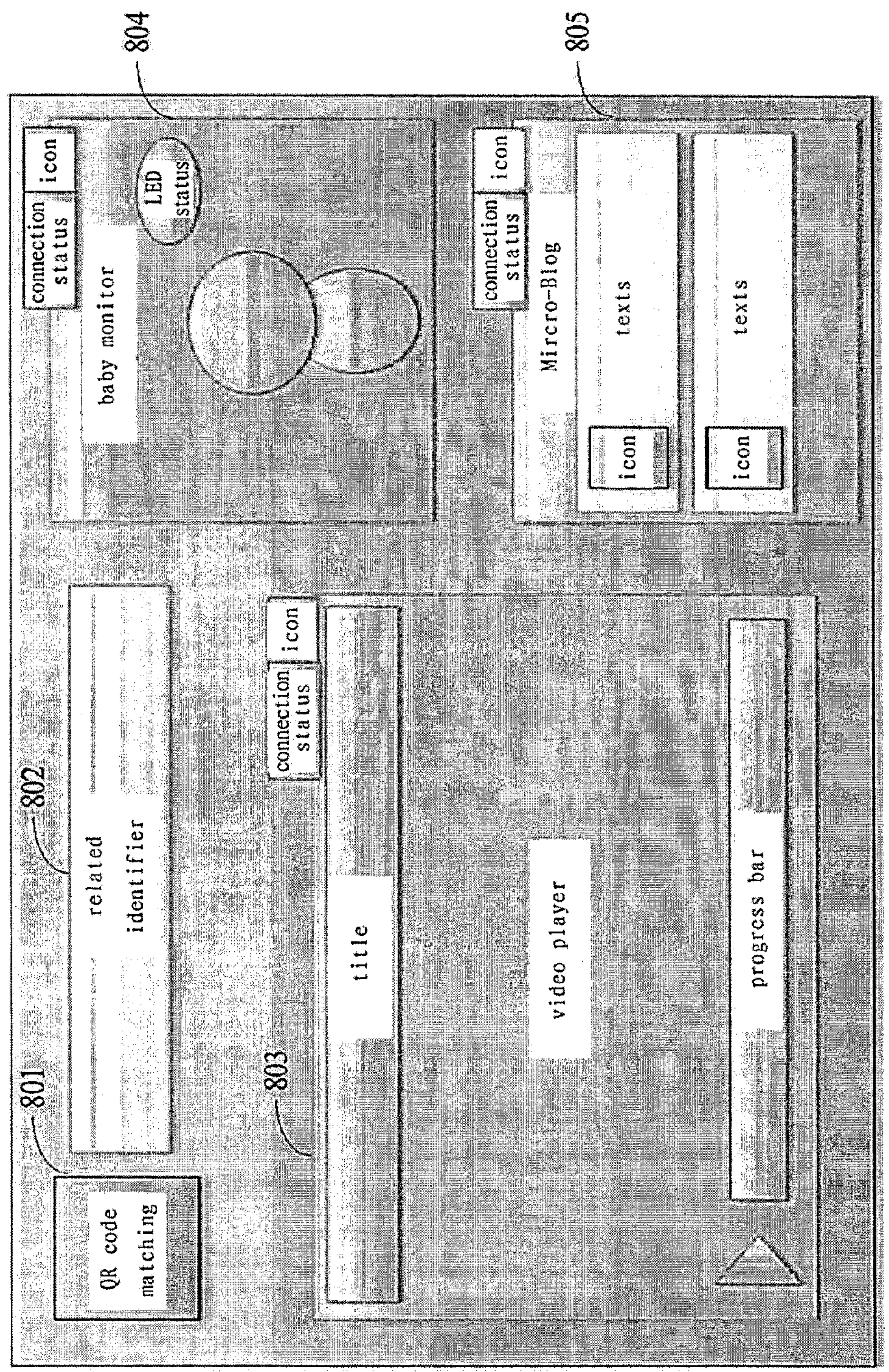
FIG. 10 illustrates an example of a display picture of the display apparatus according to an embodiment of the present invention.

FIG. 10 illustrates an example of a display picture of the display apparatus 200 according to an embodiment of the present invention.

For example, when the user powers on the display apparatus 200 such as a television and the like, and desires to view a variety of signal sources using it, the display apparatus 200 displays an initial picture in its display screen. For example, the initial picture may be the picture finally displayed when the user turns off the display apparatus 200 last time, the default display picture of the display apparatus 200, or the like. As stated in the first embodiment, the dividing module 222 has already divided the display screen of the display apparatus 200 into one or more respective areas.

As shown in FIG. 10, the dividing module 222 has already divided the display screen of the apparatus 200 into three areas. In this picture, in the area indicated by the reference numeral 801, the display apparatus 200 displays a QR code; in the area indicated by the reference numeral 802, a related identifier (such as the prompt information of the manufacture or the user, etc.) of the display apparatus 200 is displayed; in the areas indicated by the reference numerals 803, 804, and 805, the display pictures of signal source 1, signal source 2, and signal source 3 are displayed, respectively. For example, signal source 1 may be a display picture of a video player, signal source 2 may be a display picture of a baby monitor, and signal source 3 may be a display picture of a Micro-Blog (WeiBo) page. And the display areas, the sizes, and the shapes of these three different signal sources on the display apparatus 200 may be different. At this time, the user operates the remote control apparatus 100, and uses the camera mounted thereon to photograph and recognize the QR code, thereby establishing the connection between the two.

At this time, the display apparatus 200 may preferably send the information related to the initial layout of signal sources 1-3 in the display screen to the remote control apparatus, so as to prompt the user of the initial layout configuration of the display apparatus 200.

Specifically, for example, after the connection is established between the display apparatus 200 and the remote control apparatus 100, the extracting module 224 in the setting unit 220 of the display apparatus 200 extracts the current initial layout information, which indicates the initial layout of one or more signal sources (i.e., signal sources 1-3) in the display screen of the display apparatus 200. Thereafter, the extracting module 224 sends the extracted initial layout information to the sending unit 230, so that this information is further sent to the remote control apparatus 100.

In step S420, an initial layout image is displayed.

Specifically, in the remote control apparatus 100, the receiving unit 160 obtains the initial layout information from the display apparatus 200 through the established connection, and sends said initial layout information to the display unit 150.

The display unit 150 displays one initial layout image to the user according to the initial layout information, so as to cause the layout of one or more windows comprised in the initial layout image to correspond to the initial layout of one or more signal sources in the display screen of the display apparatus 200.

Figure 11:
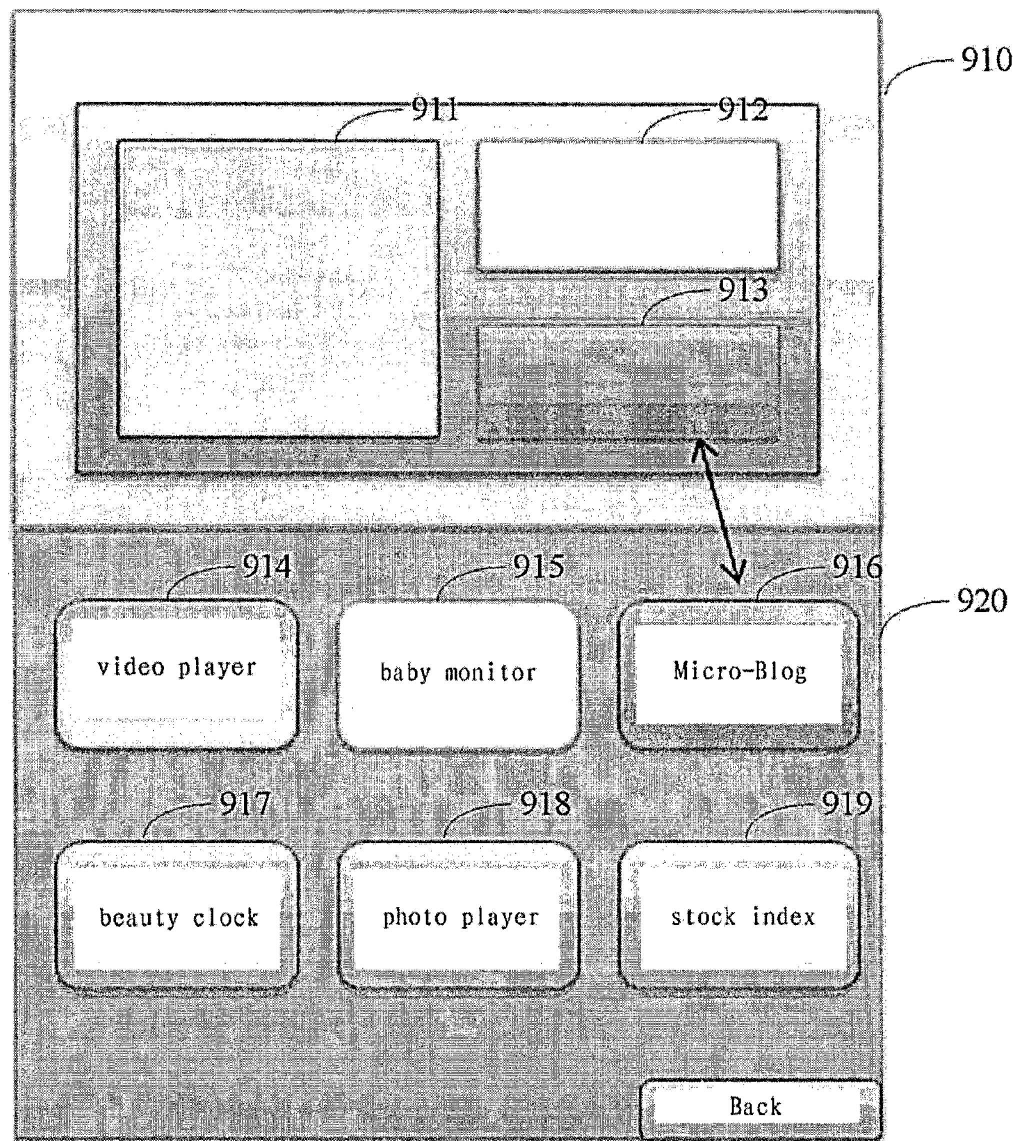
FIG. 11 illustrates an example of a display picture of the remote control apparatus according to an embodiment of the present invention.

FIG. 11 illustrates an example of a display picture of the remote control apparatus 100 according to an embodiment of the present invention.

As shown in FIG. 11, at this time, for example, the display unit 150 may set a first display area (also referred to as a "hot zone") 910 in its own display area, the length-width ratio of the first display area 910 being the same or substantially the same as the length-width ratio of the display screen of said display apparatus 200. Thereafter, the display unit 150 displays proportionally one initial layout image in the first display area 910 according to the initial layout information. The initial layout image includes three windows 911-913, which respectively correspond to three signal sources 803-805 displayed in the display screen of the display apparatus 200 (as shown in FIG. 10), and the layout of the three windows 911-913 comprised in the initial layout image corresponds completely or approximately to the initial layout of three signal sources 803-805 in the display screen of the display apparatus 200.

Thus, the user can visually learn the current display picture on the display apparatus 200 through the initial layout image displayed in the first display area 910 of the display unit 150. Then, the user may possibly desire to change the display of the display apparatus 200 by operating the remote control apparatus 100, which may need to display information about a variety of signal sources currently available to the display apparatus 200 to the user.

At this time, in the remote control apparatus 100, for example, the obtaining unit 140 may further obtain identifiers of the signal sources (e.g., signal sources 1-3, etc.) that have been connected with the display apparatus 200 from the display apparatus 200. Of course, the obtaining unit 140 may also perform a scanning operation, so as to be informed of the identifiers of other potential signal sources, which are not connected with the display apparatus 200 but available to the display apparatus, in the current application scenario.

Correspondingly, the display unit 150 may preferably set a second display area (also referred to as "list area") 920 in its own display area as well, one or more candidate windows corresponding to one or more signal sources available to the display apparatus 200 being displayed in the second display area 920. For example, the display unit 150 displays six candidate windows 914-919 corresponding to six signal sources (i.e., a video player, a baby monitor, a Micro-Blog, a beauty clock, a photo player, and a stock index) in the second display area 920. Obviously, when the display apparatus 200 comprises even more signal sources, the user may, for example, switch candidate windows corresponding to a next group of available signal sources by performing a sliding operation on the second display area 920 of the display unit 150.

Thus, the user can visually learn all the signal sources currently available to the display apparatus 200 through an available signal source list displayed in the second display area 920 of the display unit 150. Further, location information of the signal sources in the current display apparatus 200 may be identified by match between the colors of the candidate windows in the list area and the colors of the windows in the hot area, and may also be identified by the same text identifiers and/or serial numbers.

In addition, the display unit 150 may also display a "Back" button in the second display area 920 to enable the remote display apparatus 200 to return to other application operating interfaces from the related control application interface, so as to perform other operations in addition to remotely controlling the display apparatus 200.

In step S430, an adjustment operation is obtained, the layout of one or more windows in the initial layout image being adjusted according to the adjustment operation.

Specifically, after the user learns the current layout situation of the display apparatus 200 and the list of the signal sources available to said display apparatus through the remote control apparatus 100, the user may possibly desire to adjust the content, the size, the location, the shape, etc. of the signal sources displayed in the display screen of the display apparatus 200 by operating the remote control apparatus 100. At this time, in the remote control apparatus 100, the adjustment unit 170 obtains the adjustment operations performed by the user, and causes the display unit 150 to adjust the layout display of said one or more windows in said initial layout image according to said adjustment operation, so as to feed back to the user in real-time the adjusted display effect after the adjustment.

Preferably, the display unit 150 may be a touch screen. The user learns the current display layout of the display apparatus 200 through the first display area 910 and the second display area 920 being both displayed in the touch screen. Further, the user may perform a touch operation on the touch screen to modify the layout of one or more windows displayed in the first display area 910, so as to change correspondingly the layout of the signal sources in the display screen of the display apparatus 200.

FIGS. 12*a*-12*d* illustrate an example of adjustment of the layout control image according to an embodiment of the present invention.

In the first example, when the user desires to display only signal source 1 and signal source 2 in the display apparatus 200, i.e., when the user needs to remove the display of signal source 3 from the display screen, he/she can achieve said objective by moving the third window 913 corresponding to signal source 3 in the first display area 910 from the first display area 910 to the second display area 920 in the touch screen, or by long-pressing the third window 913 in the touch screen to display a candidate operation menu and select the remove operation therefrom.

Figure 12A:
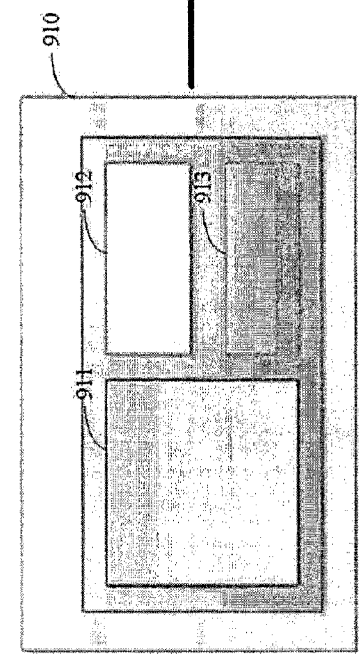
FIGS. 12*a*-12*d* illustrate an example of adjustment of the layout control image according to an embodiment of the present invention.
Figure 12B:
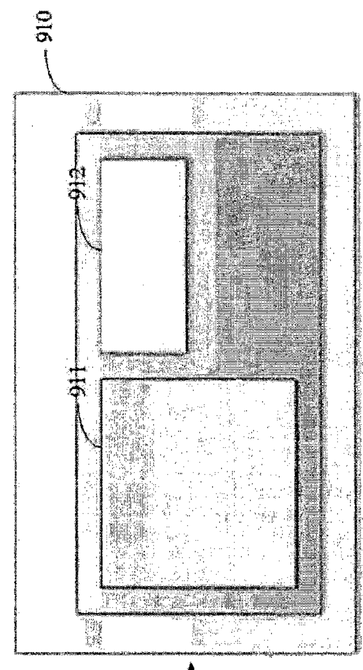

Thus, the initial layout image shown in FIG. 12*a* changes to the layout control image shown in FIG. 12*b*. At this time, as in the first embodiment, the determining unit 110 may cause the generating unit 120 to generate in real-time the layout control information according to the changed layout control image, so as to enable the display apparatus 200 to display in real-time the display picture corresponding to the layout control image shown in FIG. 12*b* and comprising only signal source 1 and signal source 2, according to the changed layout control image.

In the second example, when the user desires to further adjust the display size of signal source 2 in the display apparatus 200 based on the result of the first example, he/she may achieve said objective by clicking the second window 912 in the touch screen, and pinching out or in two fingers clicking on the borders of the second window, so as to enlarge or reduce the area occupied by the second window 912 to which signal source 2 corresponds. Thus, the layout control image shown in FIG. 12*b* changes to the layout control image shown in FIG. 12*c*. Obviously, the user may also change the shape of one or more windows in the initial layout image or the layout control image through a similar operation.

In the third example, when the user desires to further change the display locations of signal source 1 and signal source 2 in the display apparatus 200 based on the result of the first example, he/she may achieve said objective by clicking and moving the first window 911 and the second window 912 in the touch screen so as to cause the two to exchange locations. Thus, the layout control image shown in FIG. 12*b* changes to the layout control image shown in FIG. 12*d*.

Figure 13B:
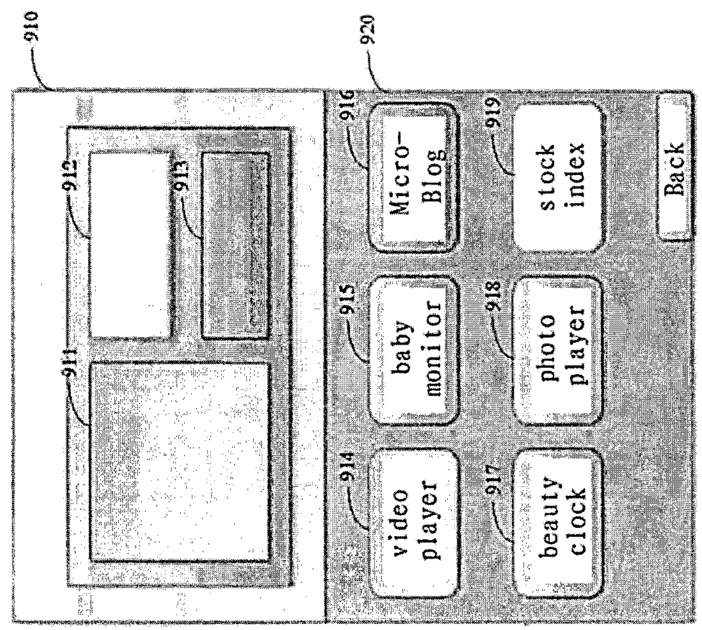
FIGS. 13*a* and 13*b* illustrate another example of adjustment of the layout control image according to an embodiment of the present invention.
Figure 13A:
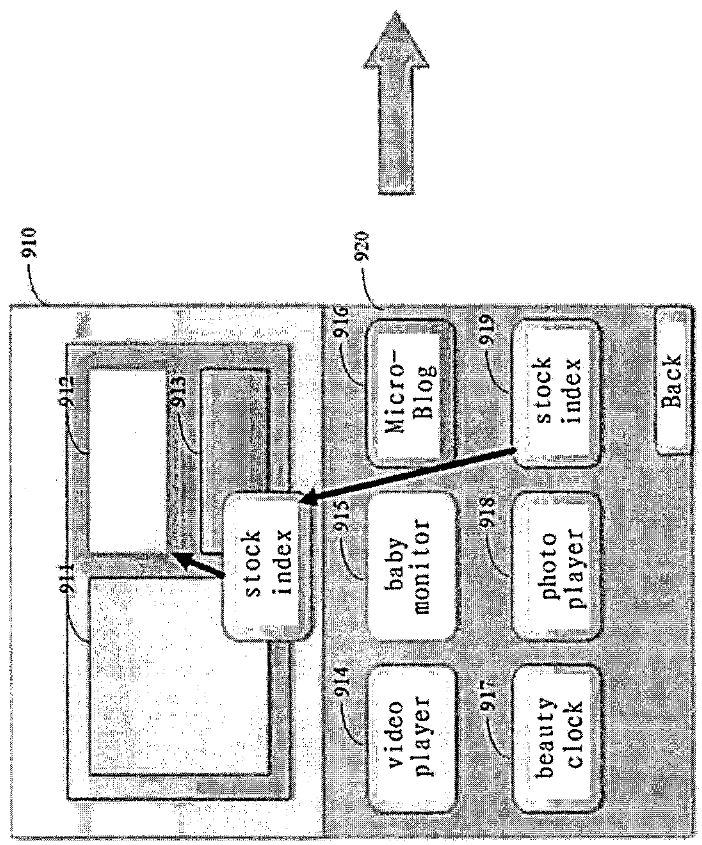

FIGS. 13*a* and 13*b* illustrate another example of adjustment of the layout control image according to an embodiment of the present invention.

In the fourth example, when the user desires to replace signal source 2 with other available signal sources based on the initial layout image, for example, the user may click, in the signal source list, the candidate window 919 (for example, a window showing the stock index) corresponding to signal source 6 in the second display area 920, and move it onto the location of signal source 2 in first display area 910, so as to highlight the area of the second window 912 corresponding to signal source 2. At this time, when the user releases the candidate window 919 on the second window 912, the new signal source 6 replaces signal source 2. Thus, the layout control image shown in FIG. 13*a* changes to the layout control image shown in FIG. 13*b*, wherein the second window 912 is labeled as signal source 6 through colors, texts, serial numbers, or the like.

In addition, in the above fourth example, preferably, when the area of the second window 912 corresponding to signal source 2 is highlighted, the display unit 150 of the remote control apparatus 100 may further return confirmation information to the user, to prompt the user whether to perform a replace operation. Only after receiving the user confirmation, in the first display area 910, the new signal source 6 will replace signal source 2 that already exists in the current page layout so as to be displayed in the second window 912. Similarly, if the candidate window in the second display area 920 is moved into a blank area within the first display area 910, the display unit 150 may display the locations where the currently-moved signal source can be released, and mark the window area with dotted lines. After the user places the window, he/she may further drag the borders of the window corresponding thereto so as to adjust the size and the shape of the window area.

Of course, the user may also generate the layout control image in a user-defining way rather than based on the initial layout image. For example, the user may on his/her own draft a window area by operations such as touching and so on, the window area drafted by the user for example is first denoted by dotted lines (as shown in the area 912 in FIG. 12*c*), and the user may further adjust the size and the location of the user-defined window area through the remote control apparatus, and the window area is changed from dotted lines to solid lines after the final confirmation.

Furthermore, in the above examples, when an adjustment operation is performed to one or more windows corresponding to one or more signal sources, preferably, the obtaining unit 140 further obtains attribute information of the signal source corresponding to a window to be adjusted, and judges whether said adjustment operation is allowed to be performed according to the attribute information. If so, the layout of the window in the initial layout image is adjusted according to said adjustment operation. For example, the user of the display system may be very concerned about the growth of his/her baby, and thus set the priority of the signal source of the baby monitor to be significantly high and set a predetermined threshold on the size of the window area of said signal source. When the user attempts to remove the window corresponding to said signal source in the remote control apparatus 100, or when the user attempts to adjust its size to be smaller than the predetermined threshold, the obtaining unit 140 judges that this adjustment operation is not allowed according to the obtained attribute information, thus the adjustment operation is not performed to the window and the user is prompted that the adjustment operation is prohibited.

That is to say, it may be based on practical requirements to determine whether to change the windows corresponding to the respective signal sources, such as enlarging the coverage, narrowing the display area and so on, these changes depending on the design logics of the signal sources themselves.

In step S440, a layout control image is determined.

Specifically, after the adjusting unit 170 adjusts the layout of one or more windows in the initial layout image according to the adjustment operation, the determining unit 110 selects one layout control image from the displayed multiple layout control images according to the user's input operation, so as to determine the layout control information that the user desires to use.

In addition to that the user manually adjusts the layout through the adjusting unit 170, as in the first embodiment, it may be possible to obtain the multiple preset layout control images directly by the obtaining unit 140.

At this time, in order to let the user select the layout to be used more conveniently, preferably, the preset layout control images may be first classified into layout control schemes depending on the difference of signal sources comprised in each layout control image. In each layout control scheme, contents of the signal sources are fixed, i.e., the identifiers of the signal sources are fixed. For example, the first layout control scheme comprises signal source 1, signal source 2, and signal source 3; the second layout control scheme comprises signal source 1 and signal source 2; and the third layout control scheme comprises signal source 2 and signal source 3.

Further, multiple layout control images are further comprised in the same layout control scheme, and in each layout control image, the layout of the signal sources comprised in said layout control scheme is different. For example, the second layout control scheme may comprise the first layout control image shown in FIG. 12*b*, the second layout control image shown in FIG. 12*c*, and the third layout control image shown in FIG. 12*d*.

Thus, for example, when the obtaining unit 140 detects that the user is performing an up-down sliding operation on the first display area, the display unit 150 may switch among different layout control schemes. For example, the user may perform a switching operation among the three layout control schemes shown in FIGS. 9*a* to 9*c*, through the up-down sliding operation. Similarly, the user may even switch to a completely blank layout control scheme by the up-down sliding operation so as to newly set one or more layout control images therein in a user-defining way.

Figure 12C:
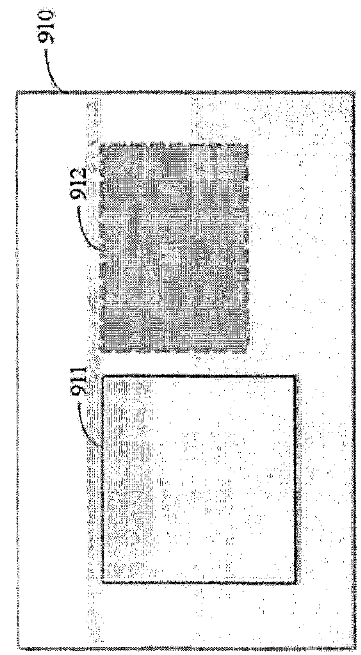
Figure 12D:
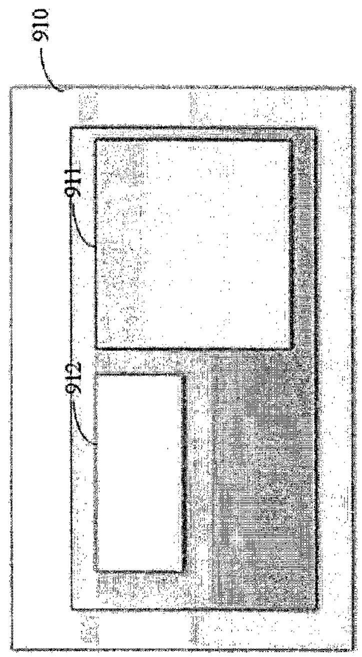

When the obtaining unit 140 detects that the user is performing a left-right sliding operation on the first display area, the display unit 150 alternately display different layout control images in the same layout control scheme. For example, after the user firstly determines the first layout control scheme shown in FIG. 9*a*, he/she may continue to switch among the three layout control images as shown in FIGS. 12*b*-12*d* through the left-right sliding operation.

Thereafter, the determining unit 110 selects one layout control image from the displayed multiple layout control images according to the user's input operation, so as to determine the layout control information that the user desires to use.

The next steps S450 to S480 are the same as steps S330 to S360 in the first embodiment, and thus details thereof are omitted.

Thus, for example, when user determines the layout control image shown in FIG. 9*b* in step S440, the remote control apparatus 100 generates layout control information corresponding thereto, the layout control information indicating that: the display screen comprises signal sources 1 to 3 (respectively, a video player, a baby monitor, and a Micro-Blog), as well as the size, the location, and the corresponding additional information of each of them.

Thereafter, the display apparatus 200 parses the layout control information, extracts the identifiers and other layout control information of the respective signal sources, obtains the display signals of signal sources 1 to 3 in the corresponding connection according to the identifiers of the signal sources, and displays in its own display screen the picture shown in FIG. 10 according to their respective sizes and locations. Wherein, the main interface of the video player is displayed in the area 803 of the video player, the main interface comprising the title of the video being played, the play progress bar, and additional information such as connection status (connected or not connected), the icon of the signal source, and so on; baby pictures taken by the camera, as well as current status of the flasher (LED) of the camera, and additional information are displayed in the area 804 of the baby monitor; texts of pieces of Micro-Blog as well as the corresponding images, and additional information, etc. are displayed in the Micro-Blog area 805.

In addition, preferably, for example, when the user adjusts the remote control apparatus 100 to cause the size of the window corresponding to the Micro-Blog to enlarge, the display apparatus 200 enlarges correspondingly the screen area 805 corresponding to the Micro-Blog in the display screen, so that the display picture and the font size of the Micro-Blog are enlarged. Alternatively, the display apparatus may also enlarge the display area of the Micro-Blog according to the attribution information of the signal source of the Micro-Blog while maintaining the font thereof unchanged, so that even more pieces of Micro-Blog information can be displayed in the enlarged display area. Similarly, it is also possible to enlarge the line spacing between pieces of Micro-Blog information and so on.

Thus it can be seen that, adopting the remote control method and the display system according to the second embodiment of the present invention, it is possible to obtain the initial layout information of the display apparatus, use the initial layout information to generate the initial layout image, adjust the initial layout image according to the adjustment operation inputted by the user, generate the layout control information in the remote control apparatus, and finally cause the display apparatus to display one or more signal sources in the display screen according to said layout control information. In addition, the adjustment operation of the user can be reflected in real-time on the display apparatus, so that the user can complete an remote control operation by directly viewing the real-time display on the display apparatus, even without viewing the remote control apparatus. Therefore, in the present invention, the user can self-define and dynamically switch the layout control schemes of the desktop of the display apparatus, and self-define and dynamically switch different layout control images in each layout control scheme, so that the user can define, configure and posses multiple desktop schemes. In addition, the user can dynamically and quickly switch different desktops displayed on the display apparatus through operations on the remote control apparatus, so that he/she can quickly view different combinations of signal sources so as to adapt to a variety of needs.

In summary, the present invention enables the user to implement flexible control over the display apparatus, so as to display one or more signal sources in the display screen of the display apparatus simultaneously, to self-define the layout of the signal sources in the display screen, and to quickly switch among the signal sources.

Through the above description of the embodiments, those skilled in the art can understand clearly that the present invention may be implemented by means of software plus necessary hardware platforms, or of course, may also be implemented all by software or hardware. Based on such understanding, the entirety or a portion that the technical solutions of the present invention contribute over the background art may be embodied in the form of a software product. The computer software product may be stored in storage medium, such as ROM/RAM, disk, optical disk, etc., and comprise several instructions for enabling one computer apparatus (which may be a personal computer, a server, or a network equipment, etc.) to execute the methods described in the respective embodiments or described in certain parts of the embodiments of the present invention.

Various embodiments of the present invention are described above in detail. However, those skilled in the art should understand that various modifications, combinations or sub-combinations may be made to these embodiments without departing from the principles and spirits of the present invention and such modifications should fall within the scope of the present invention.

What is claimed is:

1. A remote control method applied in a remote control apparatus, said remote control apparatus being used to remotely control display of one or more signal sources in a display screen of a display apparatus, said method comprising:

determining, by circuitry of the remote control apparatus, a layout control image, one or more windows being comprised in said layout control image;

generating, by the circuitry, layout control information according to the layout of said one or more windows in said layout control image; and sending, by the circuitry, said layout control information to said display apparatus so that said display apparatus sets correspondingly said one or more signal sources in a layout of one or more areas of the display screen of said display apparatus according to said layout control information, wherein the display apparatus sets correspondingly said one or more signal sources in the layout of one or more areas of the display screen by:

dividing the display screen of said display apparatus into one or more areas;

configuring the layout of said one or more areas in said display screen to proportionally correspond to the layout of said one or more windows in said layout control image according to the received layout control information; and displaying said one or more signal sources in said one or more areas respectively.

2. The method according to claim 1, wherein the determining of the layout control image comprises:

obtaining, by the circuitry, multiple preset layout control images, the layouts of said one or more windows in said multiple layout control images being different;

selecting, by the circuitry, one layout control image from said multiple layout control images; and setting, by the circuitry, the selected layout control image as said layout control image.

3. The method according to claim 1, wherein the determining of the layout control image comprises:

displaying, by the circuitry, an initial layout image, one or more windows being comprised in said initial layout image, the layout of said one or more windows in said initial layout image corresponding to the initial layout of said one or more signal sources in the display screen of said display apparatus;

obtaining, by the circuitry, an adjustment operation;

adjusting, by the circuitry, the layout of said one or more windows in said initial layout image according to said adjustment operation; and setting, by the circuitry, the adjusted initial layout image as said layout control image.

4. The method according to claim 3, wherein the displaying of the initial layout image comprises:

obtaining, by the circuitry, initial layout information indicating the initial layout of said one or more signal sources in the display screen of said display apparatus; and displaying, by the circuitry, said initial layout image according to said initial layout information, so that the layout of said one or more windows in said initial layout image corresponds to the initial layout of said one or more signal sources in the display screen of said display apparatus.

5. The method according to claim 4, wherein the displaying of said initial layout image according to said initial layout information comprises:

setting, by the circuitry, a first display area, whose length-width ratio is the same as the length-width ratio of the display screen of said display apparatus; and displaying, by the circuitry, proportionally said initial layout image in said first display area according to said initial layout information.

6. The method according to claim 5, said method further comprising:

obtaining, by the circuitry, one or more signal sources of said display apparatus;

setting, by the circuitry, a second display area; and displaying, by the circuitry, in said second display area one or more candidate windows which correspond to said one or more signal sources.

7. The method according to claim 6, wherein said adjustment operation comprises one or more of:

changing, by the circuitry, the size of one or more windows in said initial layout image; changing the location of one or more windows in said initial layout image; changing, by the circuitry, the shape of one or more windows in said initial layout image; removing one or more windows from said initial layout image; adding, using the circuitry, one or more candidate windows displayed in said second display area into said initial layout image; replacing, by the circuitry, one or more windows in said initial layout image with one or more windows displayed in said second display area.

8. The method according to claim 6, wherein the obtaining of one or more signal sources of said display apparatus comprises:

obtaining, by the circuitry, signal sources already connected with said display apparatus from said display apparatus; and/or scanning, by the circuitry, potential signal sources, which are not connected with said display apparatus but available to said display apparatus.

9. The method according to claim 3, wherein the adjusting of the layout of said one or more windows in said initial layout image according to said adjustment operation comprises:

obtaining, by the circuitry, attribute information of said one or more windows;

judging, by the circuitry, according to said attribute information, whether said adjustment operation is allowed to be performed; and if so, adjusting the layout of said one or more windows in said initial layout image according to said adjustment operation.

10. The method according to claim 1, wherein said layout control information comprises: the number of signal sources displayed in the display screen of said display apparatus, as well as the identifier, the display location, the display size, the display shape, and/or additional information of each signal source.

11. A remote control method applied in a display apparatus, said display apparatus being used to display one or more signal sources in a display screen according to remote controlling of a remote control apparatus, said method comprising:

receiving, by circuitry of said display apparatus, layout control information indicating the layout of one or more windows comprised in layout control image, said layout control image being determined in said remote control apparatus; and setting, by the circuitry, correspondingly said one or more signal sources in a layout of one or more areas of the display screen of said display apparatus according to said layout control information by:

dividing the display screen of said display apparatus into one or more areas;

configuring the layout of said one or more areas in said display screen to proportionally correspond to the layout of said one or more windows in said layout control image according to the received layout control information; and displaying said one or more signal sources in said one or more areas respectively.

12. The method according to claim 11, said method further comprising:

sending, by the circuitry, to said remote control apparatus an initial layout information indicating the initial layout of said one or more signal sources in the display screen of said display apparatus.

13. The method according to claim 11, said method further comprising:

sending, by the circuitry, signal sources already connected with said display apparatus to said remote control apparatus; and/or receiving, by the circuitry, potential signal sources, which are not connected with said display apparatus but available to said display apparatus.

14. The method according to claim 11, wherein said layout control information comprises: the number of signal sources displayed in the display screen of said display apparatus, the identifier, display location, display size, display shape, and/or additional information of each signal source.

15. A remote control apparatus for remotely controlling display of one or more signal sources in a display screen of a display apparatus, said apparatus comprising:

circuitry configured to determine a layout control image, one or more windows being comprised in said layout control image;

generate layout control information according to the layout of said one or more windows in said layout control image; and send said layout control information to said display apparatus so that said display apparatus sets correspondingly said one or more signal sources in a layout of one or more area of the display screen of said display apparatus according to said layout control information, wherein to set correspondingly said one or more signal sources in the layout of one or more areas of the display screen, the display apparatus is configured to:

divide the display screen of said display apparatus into one or more areas;

configure the layout of said one or more areas in said display screen to proportionally correspond to the layout of said one or more windows in said layout control image according to the received layout control information; and display said one or more signal sources in said one or more areas respectively.

16. A display apparatus for displaying one or more signal sources in a display screen according to remote controlling of a remote control apparatus, said apparatus comprising:

circuitry configured to receive layout control information indicating the layout of one or more windows comprised in layout control image, said layout control image being determined in said remote control apparatus; and set correspondingly said one or more signal sources in a layout of one or more areas of the display screen of said display apparatus according to said layout control information, wherein to set correspondingly said one or more signal sources in the layout of one or more areas of the display screen, the display apparatus is configured to:

divide the display screen of said display apparatus into one or more areas;

configure the layout of said one or more areas in said display screen to proportionally correspond to the layout of said one or more windows in said layout control image according to the received layout control information; and display said one or more signal sources in said one or more areas respectively.

* * * * *